J. J. MERVESP.
Calks for Horseshoes.
No. 136,379. Patented March 4, 1873.
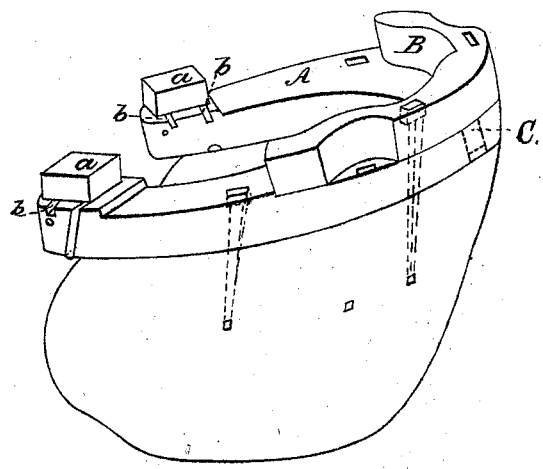
WITNESSES.
T. C. Brecht.
A. H. Norris.
John J. Mervesp
By James L. Norris.
atty.

UNITED STATES PATENT OFFICE.

JOHN J. MERVESP, OF NEW YORK, N. Y.

IMPROVEMENT IN CALKS FOR HORSESHOES.

Specification forming part of Letters Patent No. 136,379, dated March 4, 1873.

*To all whom it may concern:*

Be it known that I, JOHN J. MERVESP, of the city, county, and State of New York, have invented certain Improvements in Horseshoe-Calks, of which the following is a specification:

The object of this invention is to facilitate the attaching and detaching of calks to or from the shoes of horses without removing the shoes from the hoofs of the animal; and it consists in the combination with a horseshoe of a detachable toe-calk, provided with a projection or pin, fitting an opening or hole in the shoe, and secured thereto by two or more of the nails, which passing through the calk and shoe fasten both to the hoof of the animal; and the invention further consists in the combination with the said detachable calk of a groove, in the face of the shoe, in which to insert a tool for removing the calk, all as will be fully hereinafter described.

The figure in the drawing is a perspective view of a shoe with its detachable toe-calk applied to the hoof of an animal according to my invention.

The shoe A is provided with a recess, in which the calk is fitted, and a hole into which a projection or pin, C, on the calk B may enter for the purpose of assisting the nails in holding the calks firmly in position upon the shoe.

Several forms of said projection or pin have been shown in Letters Patent of the United States heretofore granted to me, but the nails were not used as an element of the combination, but the calks were held on the shoes by pins or keys in various ways.

Instead of said keys or pins for binding the calks firmly upon the shoes, as in those patents, it is here provided that the nails which fasten the shoe upon the hoof shall pass through the calk as well as the shoe, so that when clinched the whole will be firmly held in proper position, as clearly shown in the accompanying drawing.

Grooves *b b* are made across the face of the shoe underneath the calk, shown in this instance under heel-calks *a*, in which to introduce a tool for removing the calk when worn so as to require replacement, and said grooves are found to be exceedingly convenient, as it is often a difficult matter to displace the calk after being jammed into their sockets during the time it was wearing under severe travel.

I claim as my invention—

1. The calk B, constructed and fitted to the shoe, as specified, jointly with the mode of attaching said calk to the shoe and to the hoof of the animal, hereinbefore specified.

2. The groove *b* across the face of the shoe, underneath the calk, in which to insert a tool for removing said calk, as described.

JOHN J. MERVESP.

Witnesses:
A. J. BERRIAN,
M. A. PEARCE.